UNITED STATES PATENT OFFICE.

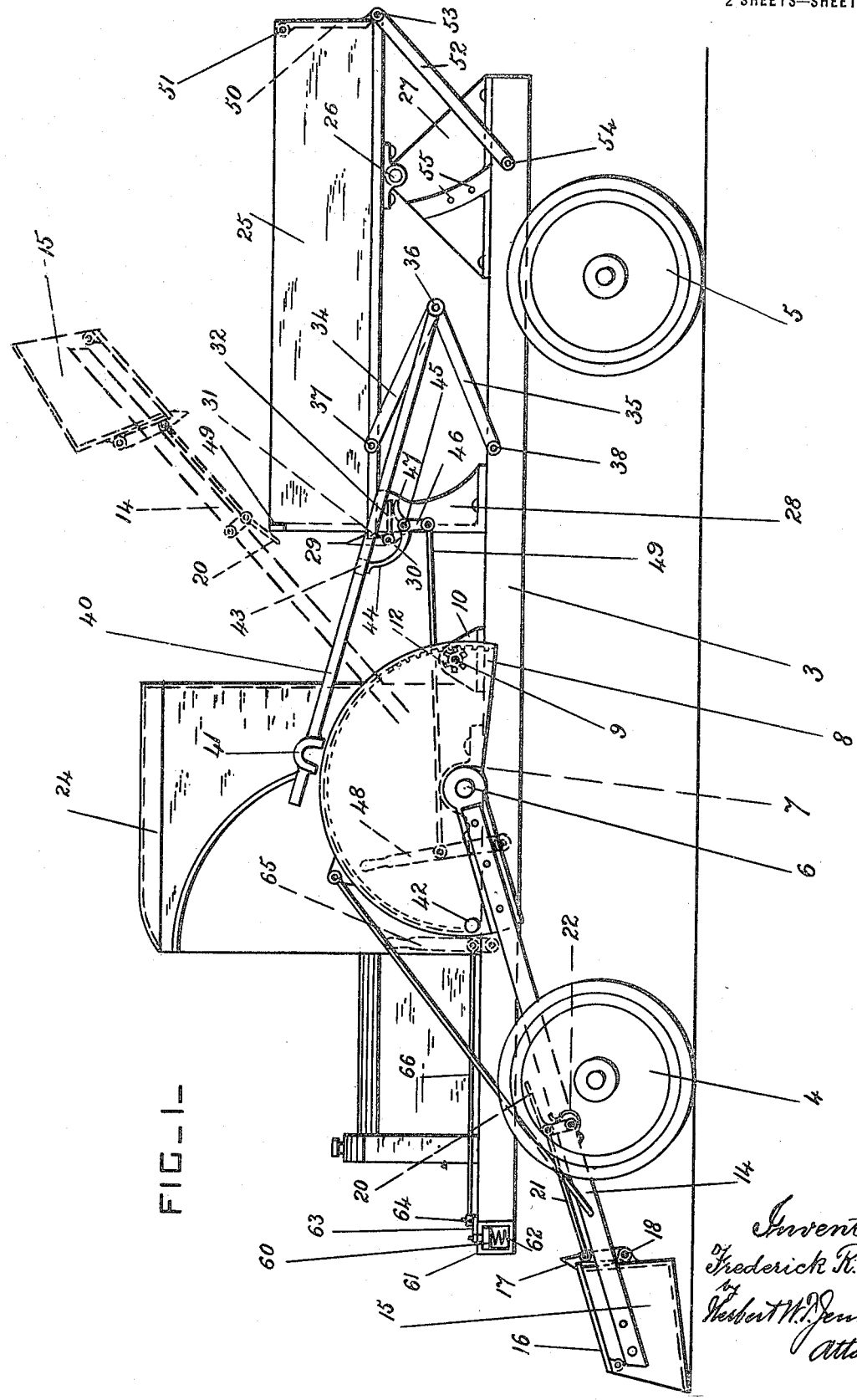

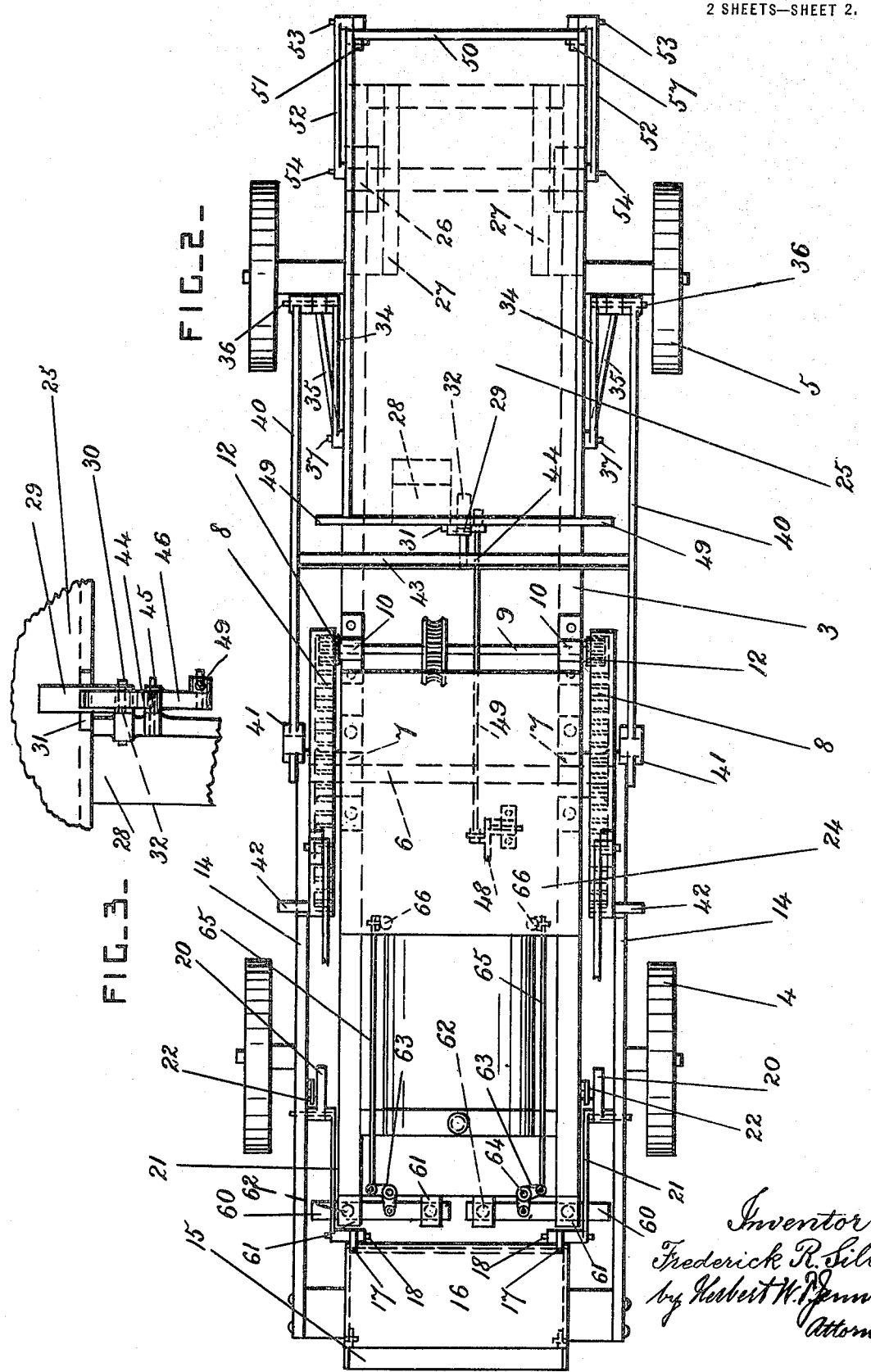

FREDERICK R. SILLS, OF STATESVILLE, NORTH CAROLINA, ASSIGNOR OF ONE-HALF TO CAROLINA MOTOR COMPANY, OF STATESVILLE, NORTH CAROLINA.

DUMPING-TRUCK.

1,380,846.  Specification of Letters Patent.  Patented June 7, 1921.

Application filed June 29, 1920. Serial No. 392,783.

*To all whom it may concern:*

Be it known that I, FREDERICK R. SILLS, a citizen of the United States, residing at Statesville, in the county of Iredell and State of North Carolina, have invented certain new and useful Improvements in Dumping-Trucks, of which the following is a specification.

This invention relates to trucks used in connection with power shovels which are used chiefly in making roads; and it consists in the means whereby the truck is tilted to discharge its contents, and also in certain features of construction as hereinafter fully described and claimed.

In the drawings, Figure 1 is a side view of a dumping truck and a power shovel constructed according to this invention. Fig. 2 is a plan view of the same. Fig. 3 is a front view of the catch for the dirt receptacle, drawn to a larger scale.

The truck is provided with a frame 3, which is mounted on front ground wheels 4, and rear ground wheels 5, and it is provided with a motor, transmission gearing, and steering devices of any approved construction, such as used on motor cars or motor trucks. A rock-shaft 6 is journaled in bearings 7 secured to the middle part of the frame, and has toothed wheel segments 8 secured on its end portions. A driving shaft 9 is journaled in bearings 10, and has toothed pinions 12 secured on its end portions, which gear into the two toothed segments. The driving shaft is operated from the car motor, or from any other motor carried by the car, and the driving mechanism used is preferably similar to that shown and described in a separate application filed on June 2, 1920, Serial Number 386,123.

Arms 14 are secured to the segments 8, and are arranged radially of the rock-shaft, and are long enough to project at the front end of the car or truck, and these arms have a shovel 15 secured to their front end portions.

In carrying out this invention the shovel 15 is preferably provided with a hinged discharging lid 16, and 17 is a catch pivoted to the shovel body by a pin 18, and normally holding the lid closed. Two similar catches may be used. A trigger 20 is provided and is pivoted to one of the arms 14, and is connected with the catch 17 by a connecting-rod 21, and 22 is a spring which normally holds the catch in engagement with the lid. The catch engages automatically with the lid when the lid is closed.

A suitable cab or shelter 24 for the operator is provided at the middle part of the frame. The receptacle 25 for dirt is arranged over the rear end portion of the frame, and is pivoted by a pin 26 to brackets 27 on the frame. The pin 26 is arranged to the rear of the center of gravity of the receptacle 25, and the front end portion of the receptacle normally rests on a support 28 so that the receptacle is substantially horizontal.

The support 28 has a catch 29 pivoted to it by a pin 30, and this catch engages automatically with a tooth or projection 31 on the front end of the receptacle 25. The catch is arranged in a substantially vertical position, and it has a rearwardly projecting arm 32 for releasing it.

Toggle links 34 and 35 are arranged at each side of the truck, and are pivoted together by pins 36. The links 34 are pivoted to the front end portion of the receptacle 25 by pins 37, and the links 35 are pivoted to the frame 3 by pins 38. When the receptacle is horizontal the links project toward the rear and form an acute angle with each other.

Rods 40 are pivoted to the pins 36 and have gab ends 41, at their front ends, which are adapted to engage with pins 42 which project from the toothed segments 8. These segments form supports for the pins 42, and permit them to be moved pivotally about the shaft 6 as a center.

A crossbar 43 is secured between the middle parts of the rods 40, and it rests on the front end portion of a lever 44 which is pivoted to the support 28 by a pin 45. The lever 44 has a downwardly projecting arm 46 for operating it, and it has a rearwardly projecting arm 47 for operating the arm 32 of the catch 29. The lever 44 is operated by means of a pivoted hand lever 48 in the cab, to which its arm 46 is connected by means of a pivoted connecting-rod 49.

The receptacle 25 is arranged so that when the shovel is raised to the position indicated by dotted lines in Fig. 1, the trigger 20 strikes the front end of the receptacle, or any other suitable device 49 carried by the receptacle. This releases the catch, and the contents of the shovel are discharged into the receptacle.

The receptacle has an end gate 50 which is pivoted by pins 51 to the upper parts of its sides. Rods 52 are pivoted to the lower part of the end gate by pins 53, and these rods are pivoted to the truck frame by pins 54. The rods 52 are arranged in inclined positions, so that the end gate is closed when the receptacle is horizontal. The distance between the pins 53 and 54 is greater than the distance between the pin 53 and the pin 26, and the position of the pins 54 can be varied by placing them in different holes 55, so as to adjust the opening of the end gate.

When a sufficient amount of dirt has been loaded by the shovel into the receptacle 25, the gab ends 41 of the operating rods are placed in engagement with the pins 42, and the receptacle is tilted by straightening the toggle links, the arms 14 which operate the shovel being moved forwardly and downwardly by the toothed segments. The weight of the arms and the shovel assists in tilting the receptacle, and the end gate of the receptacle is opened automatically to discharge the dirt at its rear end each time the receptacle is tilted. The shovel is caused to shovel up the dirt by moving the motor truck bodily forward on its ground wheels when the shovel is in contact with the ground.

As the dirt is frequently carried to a distance by the motor truck before it is discharged from the receptacle 25, supports 60 for the arms 14 are provided at the front part of the truck. These supports are slidable in guides 61 crosswise of the frame, and they rest on springs 62 so that the arms may ride without jolting. The supports 60 are slid longitudinally so as to project under the arms 14 by means of pivoted bell-crank levers 63 mounted on pins 64 carried by the frame. The bell-crank levers are operated by hand levers 65, in the cab, to which they are operatively connected by pivoted connecting-rods 66.

What I claim is:

1. The combination, with a wheeled frame, of supports pivoted to the frame and provided with laterally projecting pins, a receptacle for dirt pivoted to the frame, lever mechanism for tilting the said receptacle, operating rods connected with the said lever mechanism and provided with gab ends for engaging with the said pins, and means for moving the said supports pivotally to operate the said rods and tilt the receptacle.

2. The combination, with a wheeled frame, of a rock-shaft mounted in the frame, toothed wheel segments secured on the end portions of the rock-shaft and provided with laterally projecting pins, driving devices for oscillating the said rock-shaft, a receptacle for dirt pivoted to the frame, lever mechanism for tilting the said receptacle, and operating rods connected with the said lever mechanism and provided with gab ends for engaging with the said pins.

3. The combination, with a wheeled frame, of supports pivoted to the frame and provided with laterally projecting pins, a receptacle for dirt pivoted to the frame, lever mechanism for tilting the said receptacle, operating rods connected with the said lever mechanism and provided with gab ends for engaging with the said pins, a counterbalancing device movable pivotally with the said supports and operating to assist in tilting the receptacle, and means for moving the said supports pivotally to operate the said rods and tilt the receptacle.

4. The combination, with a wheeled frame, of supports pivoted to the frame and provided with laterally projecting pins, a receptacle for dirt pivoted to the frame, lever mechanism for tilting the said receptacle, operating rods connected with the said lever mechanism and provided with gab ends for engaging with the said pins, counterbalance arms movable pivotally with the supports and operating to assist in tilting the receptacle, retractable sliding bars carried by the frame and adapted to support the said arms when the receptacle is not being operated, and means for moving the said supports pivotally to operate the said rods and tilt the receptacle.

5. The combination, with a wheeled truck frame, of a receptacle for dirt having its rear end portion pivotally supported by the frame, toggle links pivoted together and to the said receptacle and frame, operating rods pivoted to the toggle links, driving mechanism which operates to tilt the receptacle when engaged by the free end portions of the said operating rods, and lever mechanism which normally supports the free end portions of the said rods and affords a means for moving them into and out of engagement with the said driving mechanism.

6. The combination, with a wheeled truck frame, of a receptacle for dirt having its rear end portion pivotally supported by the frame, toggle links pivoted together and to the said receptacle and frame, operating rods pivoted to the toggle links, a support for the front end portion of the receptacle, a lever pivoted to the said support and normally supporting the free end portions of the said operating rods, and driving mechanism which operates to tilt the receptacle when engaged by the free end portions of the said operating rods.

7. The combination, with a wheeled truck frame, of a receptacle for dirt having its rear end portion pivotally supported by the frame, toggle links pivoted together and to the said receptacle and frame, operating rods pivoted to the toggle links, a support for the front end portion of the receptacle, a retaining catch pivoted to the said support and normally preventing the receptacle from tilting, a lever pivoted to the said support and normally supporting the free end portions of the said operating rods and operating to release the retaining catch when moved to lower the said rods, and driving mechanism which operates to tilt the receptacle when engaged by the free end portions of the said operating rods.

In testimony whereof I have affixed my signature.

FREDERICK R. SILLS.